J. M. ROTH.
PROCESS OF FORMING COMPOSITE FERROUS AND NON-FERROUS BODIES.
APPLICATION FILED MAR. 2, 1916.
1,199,429.  Patented Sept. 26, 1916.
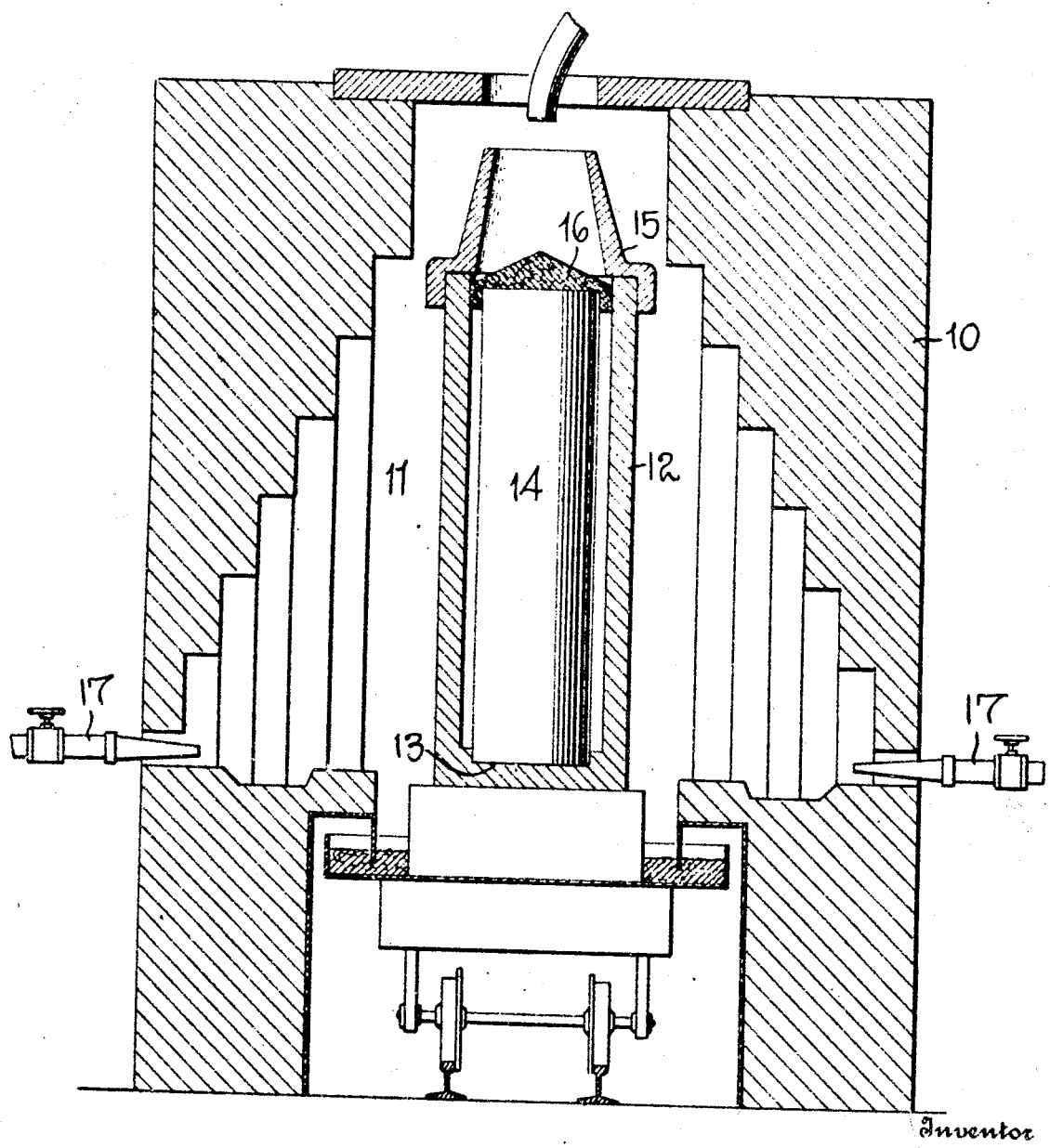
J. M. ROTH
By Watson E. Coleman
Attorney

UNITED STATES PATENT OFFICE.

JACOB M. ROTH, OF PITTSBURGH, PENNSYLVANIA.

PROCESS OF FORMING COMPOSITE FERROUS AND NON-FERROUS BODIES.

1,199,429. Specification of Letters Patent. Patented Sept. 26, 1916.

Application filed March 2, 1916. Serial No. 81,735.

*To all whom it may concern:*

Be it known that I, JACOB M. ROTH, a citizen of the United States, residing at Pittsburgh, in the county of Allegheny and State of Pennsylvania, have invented certain new and useful Improvements in Processes of Forming Composite Ferrous and Non-Ferrous Bodies, of which the following is a specification, reference being had to the accompanying drawings.

This invention relates to the formation of composite metallic bodies, and particularly to the process of welding a copper sheath upon a steel or other ferrous metal core, as described in my pending application for patent, Serial No. 45,496, filed on the fourteenth day of August, 1915.

In carrying out the process it has been usual heretofore to dispose a steel core within a mold of plumbago or other refractory material, the mold and core being placed within a furnace. The mold and core are separated by an air space equal to the thickness of the copper sheathing. In order to perform the casting and welding operation, the furnace is heated to such a temperature that the mold and the core are brought to a welding temperature. The interior of the furnace, the mold, and the core are all brought to this temperature. The molten copper is then poured into the mold and the heat of the furnace cut off. As the furnace cools relatively slowly the copper will cool relatively slowly and the copper as a consequence in its molten condition remains in contact with the steel for a relatively long time, as for instance, fifteen to twenty minutes. The copper under these circumstances takes up iron and becomes alloyed. This causes the copper to lose, to an extent, its electrical conductivity, and the longer time that the copper in its molten condition is exposed to contact with the steel, the greater will be the loss of conductivity.

In the construction of the composite bar above referred to the proportion of steel to copper is about 60% to 40%, or any other per cent., and the loss of conductivity in the copper due to the natural and slow cooling of the copper in contact with the steel is approximately 50%. Inasmuch as the value of the composite bar is proportionate to the conductivity of the copper, it is obvious that a loss of 50% in conductivity means practically a very great waste of relatively valuable material.

The object of my present invention is to avoid this loss in conductivity without at the same time destroying or impairing at any time the weld between the copper and the steel core and to provide a method by which the composite bar may be formed which will cause only a comparatively small loss in conductivity and yet which will secure the firm welding of the copper to the core and which will also decrease the time of the casting operation.

While my method may be used with many different forms of furnaces, I have illustrated in the drawing, in which the figure is a vertical sectional view of the furnace and of the mold therein, a furnace 10 having a central heating chamber 11 within which a mold 12 is supported. This mold is of refractory material, such as plumbago, and is recessed at its lower end, as at 13, for the centering of a steel core 14. The upper end of the mold 12, after the core is disposed within the mold, is closed by a pouring cap 15, and mounted upon the upper end of the core 14 is a centering cap 16 which is adapted to rise with the expansion of the core 14. It will be understood that this cap 16 is of such form that the metal poured into the pouring spout 15 may pass around the cap and so into the space between the core and the mold. Furthermore, it is to be understood that the space between the core and the mold is relatively slight. The furnace is heated by means of the burners 17 which extend into the furnace in any suitable manner and at any desired level, and these burner nozzles inject a mixture of air and gas into the furnace. The gas may be turned off and an air blast allowed to pass into the nozzles and so into the furnace whenever desired. Of course a suitable welding flux will be used to secure the proper welding of the steel to the copper.

In the carrying out of my operation, the mold is disposed within the furnace in any suitable manner, with the core 14 inside of the mold and spaced therefrom by means of the recess 13 and the cap 16. The pouring spout 15 is then disposed upon the top of the mold. The furnace is then heated and the mold and the steel core within it are subjected to a welding temperature, and the mold, the core and the furnace are kept at this "soaking" heat for 30 or 40 minutes so that every particle of the core and mold and the interior of the furnace are uniformly heated to a temperature required to effect the welding between the copper and steel. Now when this result has been secured, the temperature of the furnace and of the mold is reduced to a degree considerably below the melting point of the copper, and then the molten copper is poured into the mold. The reduction of temperature in the furnace and the mold wall does not reduce the heat of the core, but this core remains at a temperature required to effect a weld between the copper and steel. The mold, however, is chilled by the reduction of temperature so that when the molten copper is poured into the mold it immediately chills, but the core is retained at a welding temperature and a firm weld is secured between the copper and the core.

The reduction in the temperature of the furnace and of the core may be readily accomplished by cutting off the gas passing into the burner nozzles and allowing a blast of air to pass through these nozzles, into the interior of the furnace and against the mold. It has been found in practice that instead of taking something like from 15 to 20 minutes for the copper to become chilled, it only takes about 60 seconds by my improved method so that the alloying of the copper by the iron is correspondingly reduced, and this alloying of the copper almost entirely, or to a very great extent, is eliminated, thus of course increasing the conductivity of the copper. It has also been found in practice that instead of a loss of 50% of conductivity there is a loss of only about 2% in the conductivity of copper, thus obviously making the composite bar produced of a very much higher value than it was under the old process.

I of course do not wish to limit myself to any particular means for securing the proper temperature within the furnace and the proper temperature of the mold and core, nor to the means whereby a lowering of the temperature of the furnace and of the mold wall may be secured. It is obvious that this may be accomplished in many ways.

Having described the invention, what I claim is:

1. The method of forming composite bodies of welded ferrous and non-ferrous metal, consisting in inclosing a core of ferrous metal in a mold, raising the temperature of the mold and of the core to a welding temperature, rapidly cooling the mold to a temperature less than the melting heat of the non-ferrous metal, and then admitting molten non-ferrous metal into the mold.

2. The method of forming composite bodies of welded ferrous and non-ferrous metal, consisting in inclosing a core of ferrous metal in a mold, raising the temperature of the mold and of the core to a welding temperature, rapidly cooling the mold to a temperature less than the melting heat of the non-ferrous metal while maintaining the welding temperature of the core and then admitting molten non-ferrous metal to the mold.

3. The method of forming composite bodies of welded ferrous and non-ferrous metal, consisting in inclosing a core of ferrous metal in a mold, placing the mold in a furnace, raising the temperature of the furnace, of the mold, and of the core to a welding heat, and maintaining said heat for a relatively long period, then rapidly cooling the interior of the furnace and the wall of the mold to a temperature less than the melting heat of the non-ferrous metal, and then admitting molten nonferrous metal to the mold.

In testimony whereof I hereunto affix my signature in the presence of two witnesses.

JACOB M. ROTH.

Witnesses:
FREDERIC B. WRIGHT,
J. W. RENZ.